US008930176B2

(12) United States Patent
Li et al.

(10) Patent No.: US 8,930,176 B2
(45) Date of Patent: Jan. 6, 2015

(54) INTERACTIVE MULTILINGUAL WORD-ALIGNMENT TECHNIQUES

(75) Inventors: Henry Li, Beijing (CN); Matthew Robert Scott, Beijing (CN); Xiaohua Liu, Beijing (CN); Hao Wei, Beijing (CN); Ming Zhou, Beijing (CN)

(73) Assignee: Microsoft Corporation, Redmond, WA (US)

( * ) Notice: Subject to any disclaimer, the term of this patent is extended or adjusted under 35 U.S.C. 154(b) by 544 days.

(21) Appl. No.: 12/753,023

(22) Filed: Apr. 1, 2010

(65) Prior Publication Data

US 2011/0246173 A1 Oct. 6, 2011

(51) Int. Cl.
*G06F 17/28* (2006.01)

(52) U.S. Cl.
CPC ........ *G06F 17/2854* (2013.01); *G06F 17/2827* (2013.01)
USPC ................ 704/2; 704/4; 704/5; 704/7; 704/8; 704/9

(58) Field of Classification Search
None
See application file for complete search history.

(56) References Cited

U.S. PATENT DOCUMENTS

| | | | |
|---|---|---|---|
| 6,411,932 B1 | 6/2002 | Molnar et al. | |
| 7,415,411 B2 | 8/2008 | Reinhard et al. | |
| 7,580,830 B2 | 8/2009 | Al-Onaizan et al. | |
| 7,584,092 B2 | 9/2009 | Brockett et al. | |
| 2004/0006466 A1* | 1/2004 | Zhou et al. | 704/251 |
| 2004/0128353 A1* | 7/2004 | Goodman et al. | 709/204 |
| 2006/0129915 A1* | 6/2006 | Chan | 715/512 |
| 2008/0154577 A1* | 6/2008 | Kim et al. | 704/2 |
| 2009/0012775 A1 | 1/2009 | El Hady et al. | |
| 2009/0319257 A1 | 12/2009 | Blume et al. | |
| 2009/0326914 A1 | 12/2009 | Joy et al. | |
| 2010/0094614 A1 | 4/2010 | Bilac et al. | |
| 2010/0299133 A1 | 11/2010 | Kopparapu et al. | |
| 2011/0093254 A1* | 4/2011 | Kuhn et al. | 704/2 |

FOREIGN PATENT DOCUMENTS

WO    WO2009149549 A1    12/2009

OTHER PUBLICATIONS

Foster et al., "Target-Text Mediated Interactive Machine Translation", Journal of Machine Translation, vol. 12, Jul. 24, 1996, 20 pages, retrieved on Feb. 18, 2010 at <<http://citeseerx.ist.psu.edu/viewdoc/download?doi=10.1.1.31.5506&rep=rep1&type=pdf>>.

Merkel et al., "Interactive Word Alignment for Corpus Linguistics", In the Proceedings from Corpus Linguistics 2003, Lancaster, UK, Mar. 28-31, 2003, 10 pages, retrieved on Feb. 18, 2010 at <<http://www.ida.liu.se/~magme/publications/ilink-CL03.pdf>>.

(Continued)

*Primary Examiner* — Leonard Saint Cyr
(74) *Attorney, Agent, or Firm* — Dan Choi; Judy Yee; Micky Minhas

(57) ABSTRACT

Techniques for interactively presenting word-alignments of multilingual translations and automatically improving those translations based upon user feedback are described herein. With one or more implementations of the techniques described herein, a word-alignment user-interface (UI) concurrently displays a pair of bilingual sentences, where one is a translation of the other, and interactively highlights linked (i.e., "word-aligned") words and phrases of the pair. Other implementations of the techniques described herein offer an option for a user to provide feedback about the existing word-alignments or realign the words or phrases. In still other described implementations, word-alignment is automatically improved based upon that user feedback.

20 Claims, 8 Drawing Sheets

(56) References Cited

OTHER PUBLICATIONS

Nystrom, Merkel, Petersson, Ahlfeldt, "Creating a medical dictionary using word alignment: The influence of sources and resources", BMC Medical Informatics and Decision Making, vol. 7, No. 37, Nov. 23, 2007, 21 pages, retrieved on Feb. 18, 2010 at <<http://www.biomedcentral.com/content/pdf/1472-6947-7-37.pdf>>.

Razavian et al., "The Web as a Platform to Build Machine Translation Resources", The 2nd International Workshop on Intercultural Collaboration (IWIC 2009) Stanford University, Palo Alto, CA, Feb. 20-21, 2009, pp. 41-50, retrieved on Feb. 18, 2010 at <<http://delivery.acm.org/10.1145/1500000/1499233/p41-razavian.pdf?key1=1499233&key2=5159946621&coll=GUIDE&dl=GUIDE&CFID=78448975&CFTOKEN=53713989>>.

Saiz, "Novel statistical approaches to text classification, machine translation and computer-assisted translation", Doctoral Thesis, Politechnic University of Valencia, Spain, May 22, 2008, 190 pages, retrieved on Feb. 18, 2010 at <<http://dspace.upv.es/xmlui/bitstream/handle/10251/2502/tesisUPV2831.pdf?sequence=1>>.

Tiedemann, "ISA and ICA—Two Web Interfaces for Interactive Alignment of Bitexts", In the Proceedings of the 5th Conference on Language Resources and Evaluation, Genoa, Italy, May 24-26, 2006, 6 pages, retrieved on Feb. 18, 2010 at <<http://www.let.rug.nl/tiedeman/paper/Irec2006_ica_isa.pdf>>.

Zhang et al., "A Multilayered Bilingual Word-Alignment Algorithm", In the Proceedings of the 6th International Conference on Advanced Language Processing and Web Information Technology (ALPIT 2007), Luoyang, Henan, China, Aug. 22-24, 2007, pp. 63-68, retrieved on Feb. 18, 2010 at <<http://ieeexplore.ieee.org/stamp/stamp.jsp?tp=&arnumber=4460616>>.

Lee, et al., "Acquisition of English-Chinese Transliterated Word Pairs from Parallel-Aligned Texts using a Statistical Machine Transliteration Model", retrieved on Jan. 5, 2011 at <<http://edward.comp.lancs.ac.uk/acl/W/W03/W03-0317.pdf>>, Association for Computational Linguistics, Proceedings of HLT-NACCL Workshop on Building and using parallel texts: data driven machine translation and beyond, vol. 3, 2003, pp. 96-103.

* cited by examiner

INTERACTIVE MULTILINGUAL WORD-ALIGNMENT TECHNIQUES

BACKGROUND

Word-alignment plays a basic role in the fields of language translation, language learning, and other natural language processing and handling involving more than one language. Often a first body of text is translated into a second matching body of text of a different language from that of the first body of text. For example, the text of a newspaper article in English is translated into a matching article, but in German.

These translated bodies of text (i.e., bilingual parallel bodies) have alignments between corresponding segments within the bodies of text. Such alignment is commonly done by sentences and by words. The alignment itself is often performed, at least in part, by a machine translation process of a computer system programmed to do such language translations.

Presumably, the word-alignment data of bilingual parallel bodies would be helpful to someone trying to learn a language. With this information, a language learner can associate the meanings of words, in context, in one language with the contextual meaning of essentially the same words in another language. However, the conventional approaches of computer-assisted language learning have not yet successfully, efficiently, and elegantly depicted word-alignment data of bilingual parallel bodies in a manner that greatly helps in language learning.

Furthermore, machine translation is notoriously lacking in the nuances of the meaning of a natural language. This is especially so in terms of contextual nuances. Fluent human speakers/writers of natural languages do a better job of capturing those contextual nuances in meanings. However, contextual meanings and interpretations vary by person and over time. Furthermore, employing armies of human translators is typically beyond the time and resources available and affordable to most translation projects.

SUMMARY

Described herein are techniques for interactively presenting word-alignments of multilingual translations and automatically improving those translations based upon user feedback. With one or more implementations of the techniques described herein, a word-alignment user-interface (UI) concurrently displays a pair of bilingual sentences, where one is a translation of the other, and interactively highlights linked (i.e., "word-aligned") words and phrases of the pair. Other implementations of the techniques described herein offer an option for a user to provide feedback about the existing word-alignments or realign the words or phrases. In still other described implementations, word-alignment is automatically improved based upon that user feedback.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
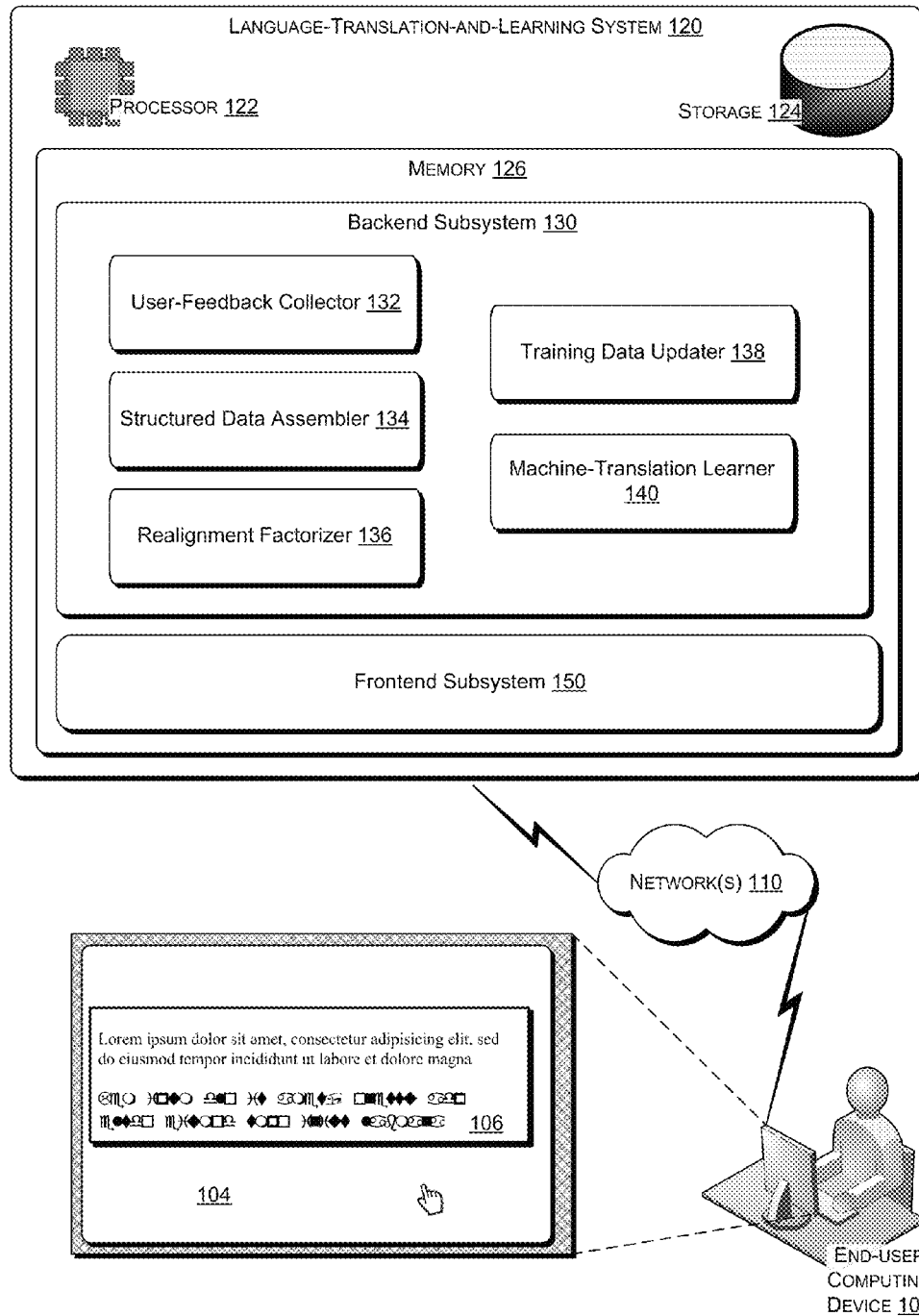
FIG. 1 illustrates an exemplary computing infrastructure that implements techniques for multilingual word-alignment described herein.

Described herein are techniques for interactively presenting word-alignments of multilingual translations and automatically self-improving those translations based upon user feedback. With one or more implementations of the techniques described herein, a word-alignment user-interface (UI) is employed to, for example, help a person learn a new language. The UI concurrently displays a pair of bilingual sentences. Each sentence is the intended to be essentially the same as the other in meaning, but one is translated from the other into another language.

The UI allows a user to interact with the sentences through use of cursor. When the user hovers the cursor over one of the words in one of the sentences, both that word and its corresponding word in the other sentence are highlighted. The two highlighted and corresponding words are word-aligned with each other because the words are translated from one language to the other. Accordingly, the user can quickly see which words translate to each other, and therefore be better able to learn word meanings in another language.

In one or more other implementations, another similar word-alignment UI may be employed to have a person, who is presumably multilingual, provide feedback about the quality of the existing word-alignments for not just one, but hopefully many more bilingual sentence pairs. Furthermore, the UI may offer this multilingual person an opportunity to realign the words between one or more bilingual sentence pairs. In this scenario, the multilingual person, using the UI, selects the preferred alignments between a displayed bilingual sentence pair.

Moreover, based upon the user-feedback techniques briefly discussed above, still other techniques described herein may gather such user feedback from a vast multitude of multilingual users, especially over the Internet and the World Wide Web (which is called a "web-scale" herein). With such a massive scale of user feedback data, the existing word-alignment model can be readjusted and thus improved. The readjusted model will better reflect the human-perceived nuances of meaning of words and be more affordable than hiring armies of language experts. The readjusted takes advantage of a concept sometimes called the "Wisdom of Crowds." With these other techniques, the readjusted model can be implemented on a new or existing dataset of bilingual sentence pairs to produce a new and self-improved multilingual textual dataset.

This brief introduction, including section titles and corresponding summaries, is provided for the reader's convenience and is not intended to limit the scope of the claims, nor the proceeding sections.

Terminology

Of course, unless specified otherwise or clear from context, terms used herein are understood by their plain meaning and as understood by those of ordinary skill in the art at the time of the filing of this document. Where additional understanding is called for, the following explanation of terminology may be useful.

Bilingual Sentence Pair: Two sentences which convey essentially the same meaning in two different natural languages. For descriptive purposes herein, the two languages are referred as L1 and L2 respectively, and the two sentences are referred as L1 sentence and L2 sentence. Of course, each of these sentences may be part of a larger group of other sentences, which form paragraphs, articles, chapters, books, etc. The term "bilingual" is used herein because it describes the pair of sentences. Of course, if more than two sentences where being considered and operated upon, bilingual would be understood to mean "multilingual" and "pair" would be a "set" which is greater than two.

Word: A word is generally understood by most speakers of a language. It is the minimum bounded unit in a language that stands alone. It usually includes one or more morphemes, which are the smallest unit of meaning in a language. Since separating words from others in a sentence can be tricky in some languages, it is presumed herein that word-aligned sentences necessarily have word boundaries defined as well.

Phrase: A collection of more than one word that functions together as a single unit within a sentence. The words of a phrase are typically co-adjacent in a sentence, but that is not always so. Phrases include sayings, idioms, and multiword names.

Word Alignment: As the two sentences in a bilingual sentence pair mean essentially the same thing, it is intuitive that a word in the L1 sentence is likely to correspond to some word in the L2 sentence. Such a correspondence between a L1 word and a L2 word is called a word-alignment link or simply "link" The collection of all links in the sentence pair is called the word alignment (or simply alignment) of a sentence pair.

Some languages, like Chinese, are character-based or sinographic. Such characters are treated like a word herein. However, there is not necessarily a one-to-one correspondence of an English word to a Chinese character. Indeed, one or more Chinese characters may correspond to one or more words in other languages, such as English.

Word-Alignment Computing System: A word-alignment computing system includes one or more computing devices that is configured to depict, expose, display, present, and/or improve word-alignment data for a dataset of one or more bilingual sentence pairs. The word alignment is generated by use of a word-alignment model.

Machine Translation: Machine translation translates text or speech from one natural language to another. Machine translation may be, for example, rule-based (e.g., dictionary), statistical, example-based, or some combination thereof. For all translations described herein, a supervised learning algorithm is employed, at least in part, to generate a word-alignment model.

Word-alignment model: Generally, a word-alignment model is a supervised learning algorithm/approach that learns something about word alignment from labeled/training data. Later, that model is used to turn defined word alignments (i.e., assigned word links/labels) into unlabeled sentence pairs.

Said another way, those of skill in the art will understand that the word-alignment model views each labeled sentence pair as a bundle of features. Each feature comes with a feature weight. Using a log-linear model, for example, the features and their feature weights are combined together to produce a score. This score is the basis for how the word-alignment model produces word alignment links. The word-alignment model knows the values of feature weights from training data. Once the feature weight values are known, the model may produce alignment links to any sentence pair.

Training Dataset: A set of data used to train the word-alignment model. The word-alignment model, described herein, is based on some kind of machine learning and therefore it uses the training dataset to learn how to produce word alignment. Each training datum of the dataset is a sentence pair annotated with its word alignment. The training dataset is a labeled dataset.

Bilingual Textual Dataset: The bilingual textual dataset is composed of a huge amount of sentence pairs that have word alignment produced by use of a word-alignment model. The bilingual textual dataset is typically unlabeled. A typical bilingual textual dataset may contain, for example, five million sentence pairs or more.

Human Natural Language: A human natural language is generally organically derived language that humans use for communication with one another. A human natural language (or simply natural language) is contrasted with an artificial or constructed language like computer-programming languages. While English and Chinese are the primary examples of languages discussed herein, any human natural language that is capable of being word-aligned, especially via machine translation, may be used.

Other terms. The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Exemplary Computing Infrastructure

FIG. 1 illustrates an exemplary networked computing infrastructure 100 that may implement the described techniques for word-alignment depiction and improvement. The infrastructure 100 may include at least one end-user computing device 102 having a display screen 104 with an exemplary word-alignment user-interface (UI) 106. This UI 106 includes two sentences that, as illustrated, contain nonsensical and unintelligible text and symbols. However, they are intended to represent, at least in this figure, an example of a bilingual sentence pair that the UI 106 would display.

The end-user computing device 102 is typically one of a vast multitude of such devices which are connected via a network 110 to a language-translation-and-learning system 120. A user may operate the computing device 102 and that user may be any person that typically uses the Internet, the World Wide Web (the "Web"), or the like. Not fully illustrated, the computing device 102 has processors, storage systems, and input/output subsystems, such as a keyboard, mouse, monitor, speakers, etc. The end-user computing device 102 typically is running one or more application programs, such as a Web browser, to view and interact with the exemplary word-alignment UI 106.

The network 110, meanwhile, represents any one or combination of multiple different types of networks, interconnected with each other and functioning as a single large network (e.g., the Internet, the Web, or an intranet). Physically, the network 110 may include wire-based networks (e.g., Ethernet, cable, dial-up telephone cabling, etc.) and/or wireless networks (e.g., local wireless network hub, wireless hotspot, mobile, cellular, satellite, etc.).

As illustrated, the language-translation-and-learning system 120 includes one or more processors 122, one or more storage systems 124, and one or more memories 126. The language-translation-and-learning system 120 includes a backend subsystem 130 that has various components, including a user-feedback collector 132, a structured data assembler 134, a realignment factorizer 136, a training data updater 138, and a machine-translation learner 140. As FIG. 1 also shows, the system 120 also includes a frontend subsystem 150.

Generally, the purpose of the frontend subsystem 150 is to allow users to effectively view and interact with word-alignment data and to provide a mechanism to gather user feedback. The frontend subsystem 150 generates and provides the user interactive features of the word-alignment UI 106. More generally, the frontend subsystem 150 may not directly present or display, but instead it may cause or help with a visual presentation or display of one or more word-alignment UIs, such as those described herein.

The backend subsystem 130 collects and processes the data obtained by the frontend subsystem 150. More specifically, the user-feedback collector 132 gathers and stores feedback from users like the one, for example, using the end-user computing device 102 using a UI like that of 106. User feedback may include, for example, the user rating the existing alignment of words in bilingual sentence pairs. It may also include the user suggesting a different alignment of those words.

After gathering the user feedback, the structured data assembler 134 processes the records of the bilingual textual dataset of bilingual sentence pairs. Each sentence pair is examined against the data structure produced by the user-feedback collector 132.

When the user performs a realignment of words rather than just rating the existing alignment, the realignment factorizer 136 is invoked to account for that realignment from the many users and produce a "corrected" group of realignments.

The training data updater 138 factors in the user-feedback ratings and the user realignment to form a new training dataset.

Using the new training dataset, the machine-translation learner 140 runs the learning algorithm to produce a new and presumably improved word-alignment model. That model is then applied to the existing or a new multilingual textual dataset. If applied to the existing dataset, the existing sentence pairs are realigned according to that new word-alignment model. The updated or new multilingual textual dataset is now made available for use by the frontend subsystem 150 for exposure to users.

As illustrated, the frontend and backend subsystems (150 and 130) and components are software modules of computer-executable instructions residing in the working memory 126 and are being executed, as needed, by the processor 122. In general, the computer-executable instructions are instructions executable on one or more computers, a computing devices, or the processors of a computer. While shown here as modules, the subsystems and components may be embodied as hardware, firmware, software, or any combination thereof. Also, while shown here residing on a single computing device (i.e., the language-translation-and -learning system 120), they may be distributed across many computing devices in the distributed system or network. The datasets and models may be stored in, for example, the storage 124.

Interactive Word-Alignment Depiction User-Interface

Figure 2A:
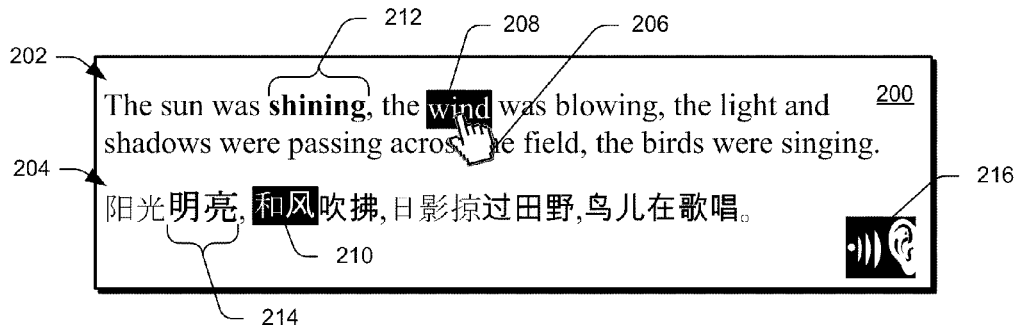
FIGS. 2A-C are exemplary illustrations of a word-alignment user interface (UI) that implement techniques related to word-alignment depiction described herein.
Figure 2B:
Figure 2C:
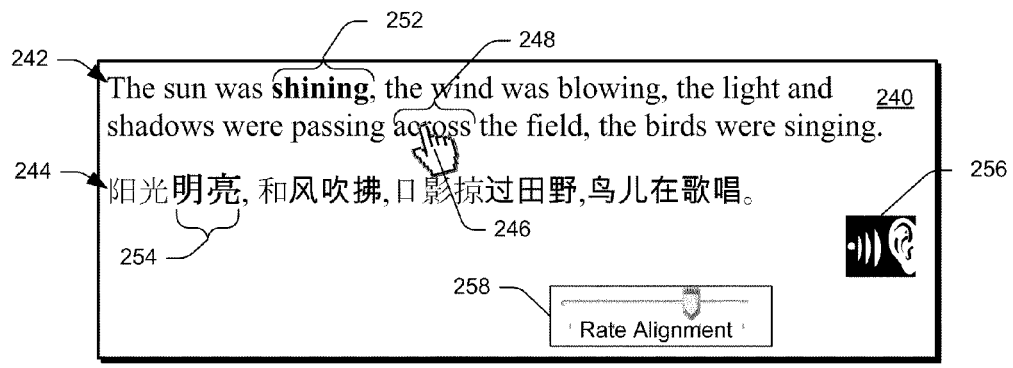

FIGS. 2A-C show three different views 200, 220, and 240 of essentially the same interactive word-alignment depiction user-interface (UI). The interactive word-alignment depiction UI may be generated by the frontend subsystem 150 and/or as part of the word-alignment depiction at 202.

Each view of the UI includes a concurrent presentation of a corresponding bilingual sentence pair. That sentence pair includes sentences 202 and 204 for UI view 200, sentences 222 and 224 for UI view 220, and sentences 242 and 244 for UI view 240. The first listed sentence of each pair is in English and reads: "The sun was shining, the wind was blowing, the light and shadows were passing across the field, the birds were singing." The second listed sentence of each pair (which is listed below the first sentence) is a Chinese translation of the first sentence.

FIG. 2A shows the UI view 200 with a graphical cursor 206 hovering over an of-interest word 208 in the English sentence 202. This action is sometimes called a "mouse hover" or a "mouseover." This somewhat passive hovering action, without any clicking or additional action by the user, can trigger an event when the graphical cursor is placed into a defined area. For this implementation, that defined area includes, at the very least, the area defined by the boundaries of the letters forming the of-interest word 208 and the white space between the letters as well.

The cursor 206 is typically moved about the UI by the user's corresponding movements of a pointing device, such as a computer mouse. Of course, a mouse is but one example of a suitable pointing device that may be used to move the cursor 206 about the UI and the entire display screen. Other examples include (but are not limited to) cursors driven by a user operating a trackball, touchpad, graphics tablet, touchscreen, joystick, pointing stick, lightpen, eye-tracking, motion-tracking remote controller, keyboard, and the like. The cursor 206 is an example of a user-directable position indicator. Of course, other suitable options for movable on-screen position indications that are directable by a user may be employed in other implementations.

In response to the cursor 206 hovering over the of-interest word 208, the UI highlights the of-interest word. As shown in UI view 200, the of-interest word 208 is "wind" and it is highlighted by reverse coloring the letters and its immediate background. In response to the very same mouse hovering, the UI also highlights, in a similar manner, another word. However, this other word is part of the second non-English sentence 204. This word is called the linked word 210 herein because it is "linked" via associated word-alignment data to the of-interest word 208. So, the linked word 210 is presumably a translation of the of-interest word (or vice versa).

For simplicity sake, this discussion here describes the of-interest word, linked word, and other such words as just that: a word. However, in this and other implementations, multiple words, which are called phrases, may be involved. Indeed, as illustrated in UI view 200, the linked word 210 is actually a phrase composed of two adjacent Chinese characters.

This paragraph is a summary of the interactive action of the word-alignment depiction UI as shown in FIG. 2A. As soon as the user (such as the user of the end-user computing device 102 of FIG. 1) moves her mouse so that the cursor 208 moves over (or very near) the of-interest word 208 "wind," both the of-interest word 208 in the first sentence 202 and its word-aligned and thus linked word 210 in the second non-English sentence 204 are concurrently highlighted. Such highlighting occurs in visually matching or corresponding manner. Also, in a converse manner, when the user moves the cursor 206 away from the of-interest word 208, both the of-interest word 208 and the linked word 210 are no longer highlighted.

Highlighting a word on the screen means, herein, to display that word in a way so that it stands out from other words. For example, a word may be highlighted by reverse coloring its letters and its immediate background. Of course, many other highlighting techniques are contemplated herein. For example, bolding, different fonts, text size, blinking, different color, spacing, italics, underscoring, and the like.

FIG. 2A also shows two other words, 212 and 214, in each of the sentences 202 and 204, respectively. Each of these words is emphasized in a corresponding manner, namely bolding. As used herein, "emphasis" is just another word for highlighting. However, an emphasis word will be highlighted differently from a word described as being "highlighted."

As illustrated here, these emphasis words 212 and 214 are not the of-interest word or the linked word. However, each emphasis word in one sentence is word-aligned with the emphasis word of the other sentence.

Here, the emphasis words are the query words. Presumably, a user chose to perform a search based upon "shining," which is the emphasis word 212, or search on its translated word 214. The result of that search includes the bilingual sentence pair, represented here by sentences 202 and 204. There are many other reasons why these word-aligned words may be emphasized. For example, for instant translation, contextual translation, and for structural understanding.

An instant translation avoids a separate translation lookup. Thus, the translation is faster and more convenient.

With a contextual translation, the emphasized words are translations of one another within the context of the sentence. This is quicker for a user to understand when compared with a separate lookup which may return a broad set of translations. In this sense, contextual translation narrows the scope of a translation which is beneficial to a user's understanding and productivity especially when a term may have a very large set of possible translation definitions, such as the word 'make'.

With a structural understanding, the emphasized words expose the structure of sentence translation. This is beneficial for learning how to write or express oneself in a foreign language. The structure refers to the ordering of words within a sentence. This is especially useful for non-Latin language pairs such as Chinese and English because the order of words within a sentence is not necessarily a 1:1 mapping between languages. In these instances, sentence structure (or word ordering) cannot be generally assumed as it might be when translating English and Spanish. Take for example, a. $w_1 \ w_2 \ w_3 \ w_4$
b. $w_2 \ w_4 \ w_1 \ w_3$ Where sentence "a" could be English and sentence "b" could be Chinese. As the user mouses over the first word ($w_1$) in a, they can see the highlighted word in b is in a different position. This indicates the structural differences in the bilingual sentence pair.

UI view 200 also includes an audio-activation selector 216. When the user selects this option, she hears one of many things depending upon other options and selections. For example, she may hear one or both sentences spoken aloud in her associated language. The words of each sentence may be highlighted in coordination with the word being spoken. Instead, she may hear each of the highlighted word-aligned words as she mouse hovers over it. Alternatively, with this option selected, speech recognition may be employed for the functionality of the user-directable position indicator. In other words, the UI may recognize which word the user is speaking, find it in one of the sentences, and then proceed as though the user hovered over the word with the mouse and thus chose it as the of-interest word.

FIG. 2B shows the UI view 220 that has, like UI view 200, the English sentence 222 and the corresponding sentence translated into Chinese at 224. A cursor 226 is shown hovering over an of-interest word 228 in the Chinese sentence 224. Because of that, the Chinese of-interest word 228 is highlighted concurrently with its word-aligned English word "light" 230 (which is the linked word for the of-interest Chinese word 228) in the English sentence 222. These sentences also have query words, 232 and 234, and an audio-activation selector 236.

FIG. 2C shows the UI view 240 that has, like UI views 200 and 220, the English sentence 242 and the corresponding sentence translated into Chinese at 244. Its cursor 246 is shown hovering over an of-interest word 248 ("across") in the English sentence 242.

However, unlike what occurred in the descriptions of FIGS. 2A and 2B, no words are highlighted in response to the hovering action. That is because there is no word-alignment associated with the of-interest word 248 ("across"). In this scenario, no linked word exists so, of course, there is no linked word highlighted. Also because there is no word-alignment, the of-interest word is not highlighted either. This way, the user quickly knows that there is no word alignment for the of-interest word. These sentences also have query words, 252 and 254, and an audio-activation selector 256.

Furthermore, using a UI like the one shown in UI view 240 here, the user may select any word (e.g., "across" at 248) and the UI will initiate additional actions based upon that word. For example, a query may be performed via an online search engine. The query may be, for example, a dictionary look-up to get a definition of the word.

This UI view 240 includes a user-feedback rating tool 258. With this tool, the user may select a rating of the existing word alignments of the concurrently displayed bilingual sentence pair, 242 and 244. The rating system may be several levels and set via a sliding bar, like as is shown at 258. Alternatively, it may be a two-tiered system. For example, thumbs-up for good or thumbs-down for bad and presumably no rating if the user has no opinion on the matter.

Using feedback from a vast multitude of users over a web-scale, the "Wisdom of Crowds" effect will help produce the answer the best reflects a more accurate word-alignment.

Interactive Word-Alignment Improvement User-Interface

FIGS. 3A-D show four different views 300, 320, 340, and 460 of similar versions of an interactive word-alignment improvement user-interface (UI). With this UI, the user has the opportunity to reassign alignment of words between the bilingual sentence pair. The interactive word-alignment improvement UI may be generated by the frontend subsystem 150 and/or as part of the word-alignment depiction at 402 and data collection at 404 (which are discussed later).

Each view of the UI includes a concurrent presentation of the corresponding bilingual sentence pair. That sentence pair includes sentences 302 and 304 for UI view 300, sentences 322 and 324 for UI view 320, sentences 342 and 344 for UI view 340, sentences 362 and 364 for UI view 360. The first listed sentence of each pair is in English and reads: "Thus, Einstein took the job in the Swiss Patent Office in 1902." The second listed sentence of each pair (which is listed below the first sentence) is a Chinese translation of the first sentence.

Figure 3A:
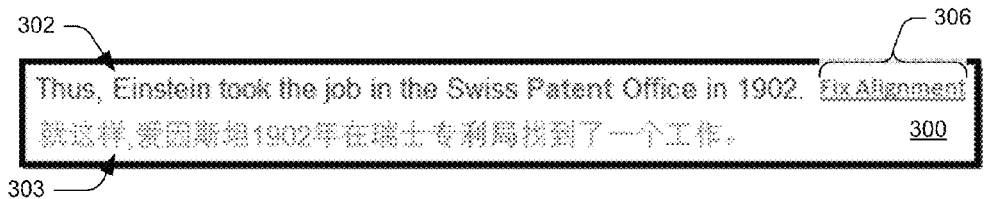
FIGS. 3A-D are exemplary illustrations of other word-alignment UIs, these illustrated UIs implement techniques related to word-alignment improvement described herein.

FIG. 3A shows the UI view 300 with a user-realignment option 306. When the user chooses the additional user-realignment option 306, she is presented the UI like that shown in UI view 320.

Figure 3B:
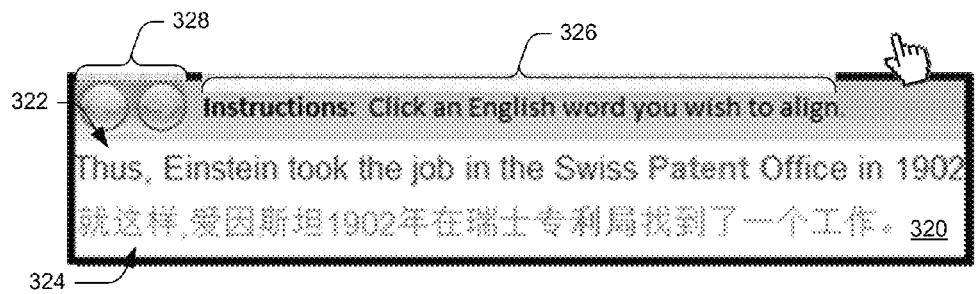

FIG. 3B shows the UI view 320. That UI has, like the UI view 300, the English sentence 322 and essentially the same sentence translated into Chinese at 324. With this UI, the user has the opportunity to reassign alignment of words between the bilingual sentence pair. Indeed, instructions 326 provided at the top of the UI view 320 indicate that by saying, "Click an English word you wish to align." Also shown here, but "grayed-out" is back-forward navigation arrows 328 for the user to step back and forth between the user's word-alignment reassignments once the reassignments are made.

Figure 3C:
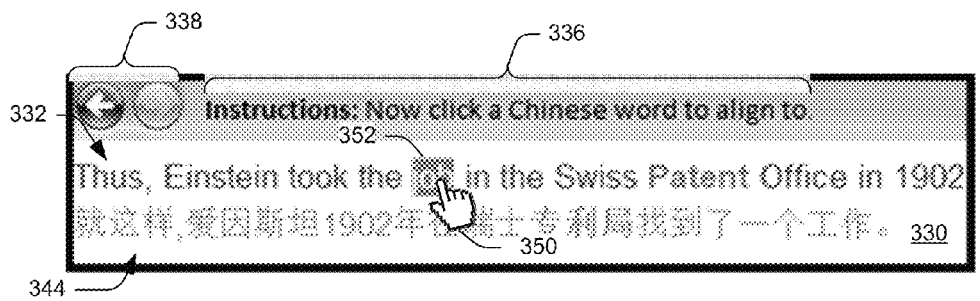

FIG. 3C shows the UI view 340 that has, like the other UI views discussed thus far, the English sentence 342 and essentially the same sentence translated into Chinese at 344. Also, like the other UI views, it has instructions 346 and navigation arrows 348. The user may use the navigation arrows 348 to navigate back and forth between the user's word-alignment reassignments once the reassignments are made.

This UI view 340 shows that the user has moved a graphical cursor 350 and selected an of-interest word 352 ("job") in the English sentence 342. This selection is more active than merely hovering like that described above with regard to the interactive word-alignment depiction UI shown at 200 and 220. Typically, the user clicking or pressing some key will cause the selection. Once the user selects the of-interest word 352, the UI highlights that word and it remains highlighted.

Figure 3D:
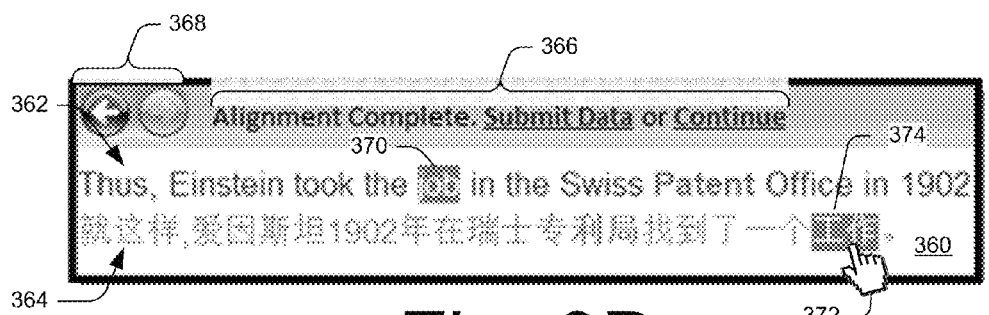

FIG. 3D shows the UI view 360 that has, like the other UI views, essentially the same two bilingual sentence pairs: 362 and 364. Also, like the other UI views, this view has instructions 366 and navigation arrows 368. In this UI view 360, an of-interest word 370 ("job") in the English sentence 362 is already highlighted because it was previously selected by the user in FIG. 3C. As depicted, the user, using a graphical cursor 372, selects a linked word 374 in the Chinese sentence 364.

So, through these actions, the user has defined a link between the English of-interest word 370 and the Chinese linked word 374. At this point, the user can select the hyperlinked option "continue" in the instructions 366 to realign more words between these two sentences. Alternatively, the user can select the hyperlinked option "submit data" to complete the realignment and send data off for processing, for example, at the Language-translation-and-learning system 120 of FIG. 1.

Self-Improving Word-Alignment Cycle

Figure 4:
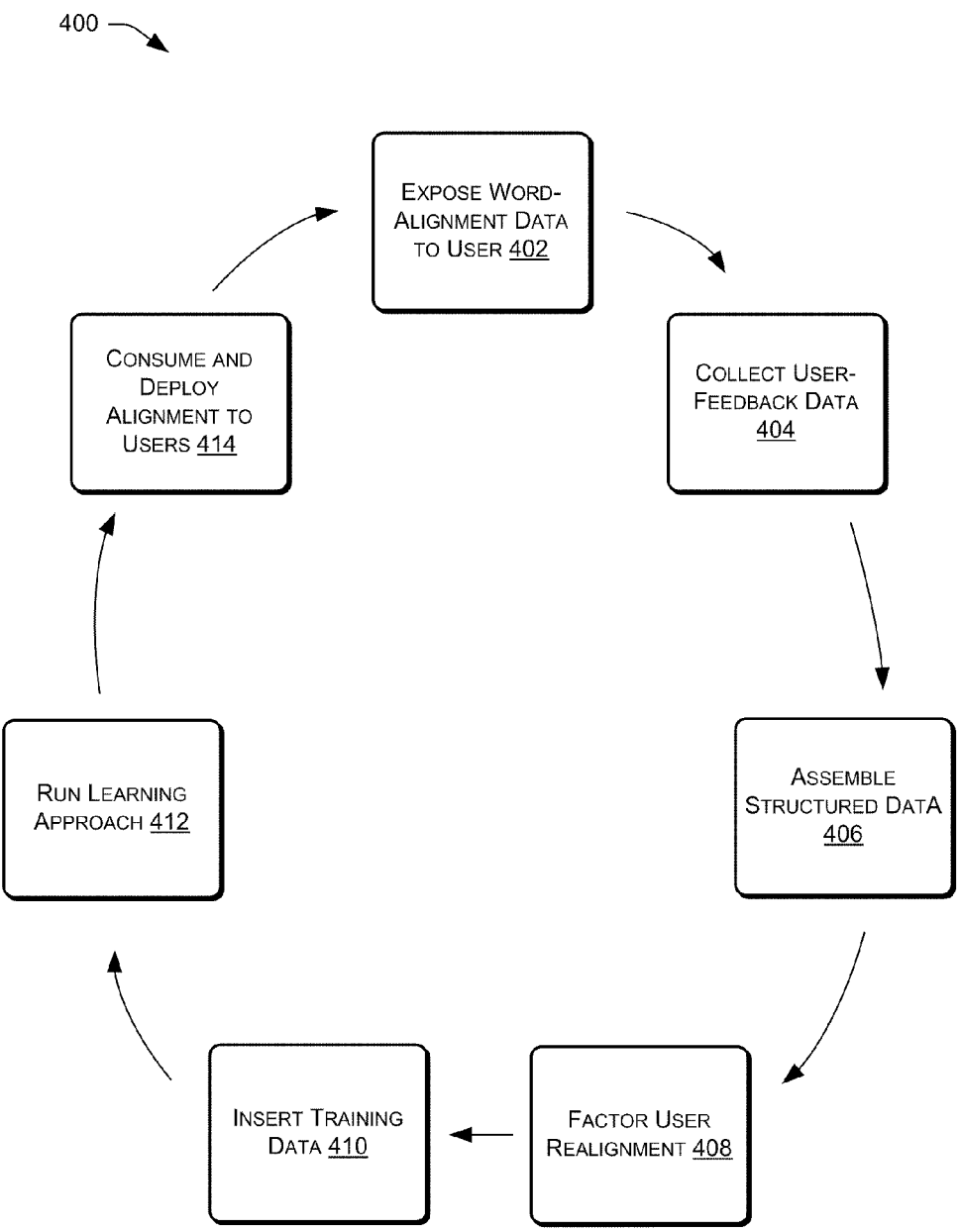
FIG. 4 is a block diagram depicting the circular end-to-end data flow of one or more techniques described herein.

FIG. 4 is a representation of a self-improving word-alignment cycle 400. While FIG. 1 shows the physical infrastructure on an exemplary implementation, FIG. 4 shows data-flow representation of that same or a similar infrastructure. In terms of the flow of data, the self-improving word-alignment cycle 400 depicts the cyclical process of exposing existing word-alignment data, improvement of that data, and redeployment of improved word-alignment data.

At 402, the existing word-alignment data is exposed. Typically, a pair of bilingual sentences is presented simultaneously via a UI, like that shown at 106. This may be implemented by the frontend subsystem 150, which may send instructions and data to the end-user computing device 102, which causes the device to produce the UI 106 on the display screen 104. The word-alignment data may be exposed, for example, within the context of an HTML web-page environment.

At 404, user feedback data is collected and stored. Typically, it is collected via a UI and stored by, for example, the user-feedback collector 132. Once collected, the user-feedback is stored in a defined word-alignment data structure to track the sentences, the user, the ratings, the realignment data, and any other useful metadata.

An example of a suitable word-alignment data structure that may be employed here includes the following fields: a sentence identifier, a user identifier, a user-feedback rating, user word realignments, and user-specific values. The sentence identifier field identifies at least one of the sentences of the bilingual sentence pair. The user identifier field identifies the user who provided feedback. The user-feedback rating field indicates an opinion of that user regarding the quality of the existing word-alignments between the bilingual sentence pair. The user word realignments field is a set of user-feedback word-alignment links for the sentence pair. Each new reassignment has metadata, such as a measure of time it took for the user to reassign word alignments. This measure of time can be used later on confidence factor calculation. For example, if the alignment was made too quickly, the confidence is lower on the accuracy of the link. The user-specific confidence value is associated with the user. This may be the overall application-specific user confidence value which helps to calibrate the contribution amongst other user contributions.

At 406, after user feedback data is gathered, it is assembled into a data structure. This may be implemented by, for example, the structured data assembler 134. Each sentence pair is examined against the data structure produced at the feedback collection. The following records for each sentence pair in the dataset may be generated:

how many positive (e.g., "thumbs-up" or ratings above a fixed amount) feedbacks are given to its existing alignment;

how many negative (e.g., "thumbs-down" or ratings below a fixed amount) feedbacks are given to its existing alignment.

Then, the following records are calculated, at 406, for each word in the designated first ("L1") sentence for a sentence pair: the link given to that word by the existing alignment model and the link (i.e., realignment) given to that word by each different user.

At 408, realignment by users is considered. This may be implemented by, for example, the realignment factorizer 136. When users perform realignments rather than just rating the existing alignment, a "corrected" group of realignments is produced. That factorization may be calculated in this manner:

1) Suppose the L1 sentence contains m words (i.e., it is of the form "w1(1) w1(2) . . . w1(m)") and suppose the L2 sentence contains n words (i.e., it is of the form "w2(1) w2(2) w2(n)").
2) Suppose there are x users (known as $u_1, u_2, u_x$) who have given feedback to that sentence pair (containing L1 and L2). Then there are x+1 voters. The first vote is by the existing word-alignment model (known as 'user 0' or $u_0$) and the others are by the human users.
3) For each L1 word w1(i), $1 \leq i \leq m$, there are n+1 candidates to be voted for, viz. {w2(0), w2(1), w2(2), w2(n)}. The candidate 'w2(0)' means that w1(i) does not align to any word in the L2 sentence, and each of the other candidates w2(j), $1 \leq j \leq n$, means that w1(i) aligns to a particular word w2(j) in the L2 sentence.

4) If a user does not give any correction to the link of w1(i), then it is assumed that she agrees with the existing link and therefore her vote is the same as that by the existing word-alignment model.

5) The vote from user $u_k$ (1≤k≤x) is assigned a weight, $W_k$. $W_k$ is determined by combining a list of factors. These factors are divided into two groups:
   (i) The first group of factors is about confidence on users. One factor is the user's credibility based on her previous records; another factor is the time that the user took before making her correction.
   (ii) The second group of factors is about confidence on the link that the user votes for. These factors may be (a) whether the link is supported by a dictionary, (b) whether the link is supported by statistical analysis of bilingual textual dataset, (c) whether the link looks reasonable given its context.

6) For each w1(i), each candidate w2(j) is assigned a score:

$$\Sigma_{k=1}^{x} W_k \cdot \delta(j, k) \quad \text{Equation (1)}$$

where δ(j, k) is defined as 1 if user k votes for candidate w2(j) and 0 otherwise. The candidate scored the highest is taken to be the new link for w1(i). The new alignment for the entire L1 sentence can thus be obtained.

At 410, the ratings of existing word-alignments and the proposed new word realignments are processed and inserted into a new training dataset. This may be implemented by, for example, the training data updater 138.

For the sentence pairs given user-feedback ratings, sentence pairs are divided into two groups: a retaining group and to-be-revised group. The retaining group will be part of the new training dataset and includes sentence pairs that have been given many positive feedbacks to their existing word alignments. The to-be-revised group will not be part of the new training dataset and includes sentence pairs that have been given many negative feedbacks to their existing word alignments. The to-be-realigned group may be later examined by a set of human language experts. Of course, other statistical calculations and thresholds may be employed in other implementations.

For the realigned sentence pairs, the corrected word realignment is calculated based upon the results from factoring user realignment at 408. The corrected word realigned sentence pairs are included as part of the new training dataset.

The data gathered from the users' feedback is used to produce the new labeled dataset for training. Based on this new training dataset, a new word-alignment model can be trained. The unlabeled dataset is all the sentence pairs in the repertoire of examples of the multilingual textual dataset. The new word-alignment model is applied to the unlabeled dataset to produce new alignment links At 412, the learning algorithm/approach is run on the updated training dataset to produce a new and presumably improved word-alignment model. This may be implemented by, for example, by the machine-translation learner 140.

At 414, the improved word-alignment model is consumed and deployed for use by users. That means the new model is then applied to the existing dataset or a new multilingual textual dataset. If applied to the existing dataset, the existing sentence pairs are realigned according to that improved word-alignment model. The updated or new multilingual textual dataset is now made available for use by the frontend subsystem 150 for exposure to users.

Finally, the cycle returns back to 402 where the updated or new multilingual textual dataset, based upon the improved word-alignment model, is exposed via a UI to users for them to, for example, learn a language or provide feedback and improve the current word-alignment.

Exemplary Processes

FIGS. 5-8 are flow diagrams illustrating exemplary processes 500, 600, 700, and 800 that implement the techniques described herein for word-alignment depiction and/or improvement. The UIs shown in FIGS. 2A-C and 3A-D are generated by and/or utilized by exemplary processes 500, 600, and 700.

Each of these processes is illustrated as a collection of blocks in a logical flow graph, which represents a sequence of operations that can be implemented in hardware, software, or a combination thereof. In the context of software, the blocks represent computer instructions stored on one or more computer-readable storage media that, when executed by one or more processors of such a computer, perform the recited operations. Note that the order in which the process is described is not intended to be construed as a limitation, and any number of the described process blocks can be combined in any order to implement the process, or an alternate process. Additionally, individual blocks may be deleted from the process without departing from the spirit and scope of the subject matter described herein.

Figure 5:
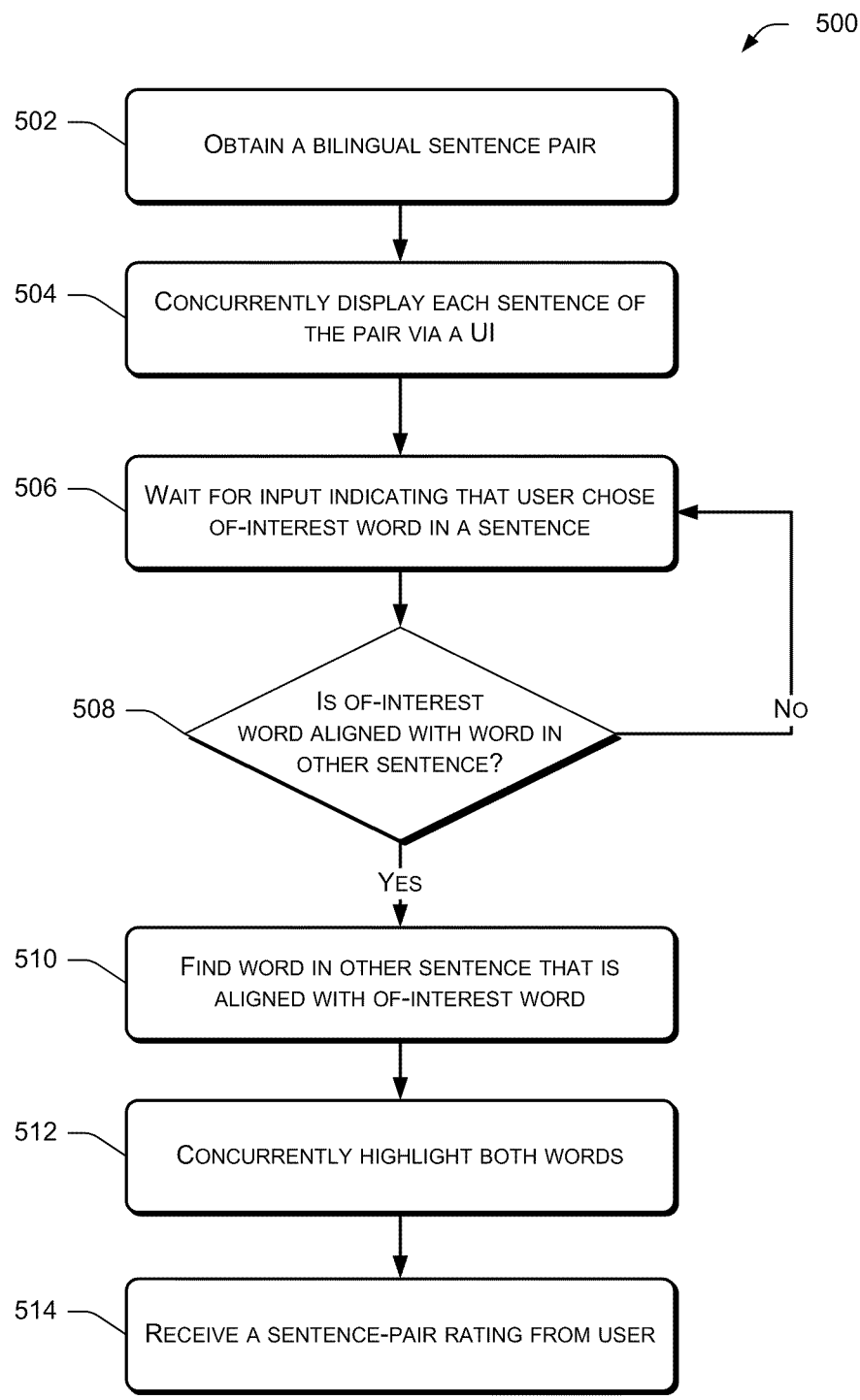
FIGS. 5-8 are flow diagrams of exemplary processes that implement techniques related to word-alignment depiction and/or automated self-improvement described herein.

FIG. 5 illustrates the process 500 for word-alignment depiction. The process is performed at least in part by a word-alignment computing system. That computing system includes one or more computing devices that is configured to depict, expose, display, present, and/or improve word-alignments for one or more bilingual sentence pairs. The word-alignment computing system includes, for example, the computing device 102, the language-translation-and-learning system 120, or some combination thereof. The word-alignment computing system that is configured as described here qualifies as a particular machine or apparatus.

As shown here, the process 500 begins with operation 502, where the word-alignment computing system obtains at least one bilingual sentence pair.

At operation 504, the word-alignment computing system concurrently displays each of the sentences of the bilingual sentence pair via a UI on an output display (like display screen 104 shown in FIG. 1). One or more word-aligned words or phrases in each sentence may be emphasized. An example of this is seen in FIG. 2A where the word "shining" 212 in the sentence 202 is emphasized along with its word-aligned confederate word or phrase, which is word 214 in the sentence 204. That emphasis conveys a particular meaning, for example, words 212 and 214 in FIG. 2A are query words. One of these two words may have been used to find the particular sentence pair shown in FIG. 2A.

At operation 506, the word-alignment computing system waits for the user to produce an input event that indicates the user has chosen an of-interest word or phrase in one of the sentences. That input event may be, for example, a mouse cursor hovering over or near (i.e., proximate) to a word or phrase. The of-interest word can be in either sentence regardless of language or order of the sentences. For the sake of clarity, the sentence with the of-interest word is called the "first" sentence herein.

At operation 508, once the of-interest word is chosen, the system determines if there is corresponding word in the other (i.e., second) sentence that is aligned with the of-interest word. If not, then the process returns to operation 506 to wait for another of-interest word to be chosen. If so, then the process proceeds to the next operation.

At operation 510, the system locates the particular corresponding word in the other (i.e., second) sentence that is aligned with the of-interest word. The particular corresponding word in the other sentence is called the linked word.

At operation 512, the system concurrently highlights both words. Said another way, the system simultaneously highlights both the of-interest word and the linked word on the screen.

Alternatively, some or all of the operations 506-512 may be described as including a determination about whether the user-directable position indicator is proximate to the of-interest word or phrase of one of the sentences of the bilingual sentence pair. When the user-directable position indicator is proximate to the of-interest word or phrase, the system finds the linked word or phrase in the other sentence pair that corresponds to the of-interest word or phrase. The linked word or phrase is found based upon pre-determined word-alignments between the bilingual sentence pair. Then, the system concurrently highlights both the of-interest word or phrase and the linked word or phrase via the UI on the display and doing so while still concurrently displaying each sentence of the bilingual sentence pair via the UI.

At operation 514, the system receives input from the user indicating the user's rating or opinion regarding the quality of the existing word-alignments of the concurrently display bilingual sentence pair.

Figure 6:
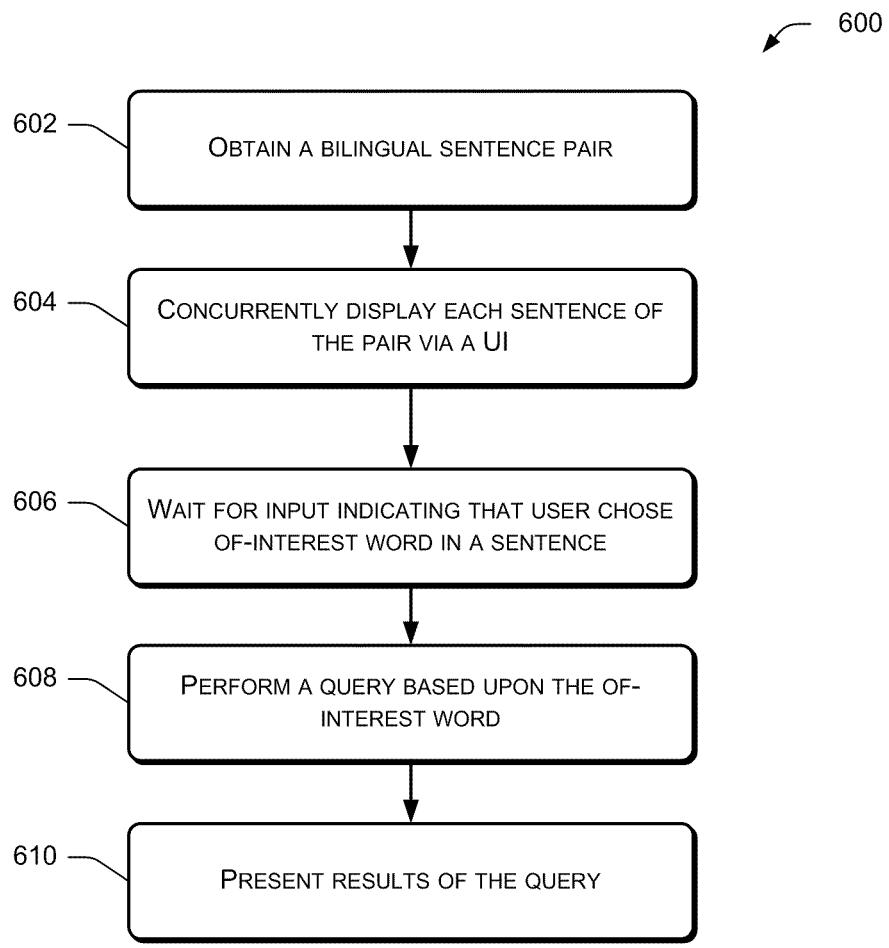

FIG. 6 illustrates another process 600 for depiction of word alignments. The process is performed at least in part by the word-alignment computing system. Process 600 employs the word-alignment computing system like that of process 500. Also, process 600 may be employed concurrently with process 500, or separately.

As shown here, the process 600 begins with operation 602, wherein the word-alignment computing system obtains at least one bilingual sentence pair. At operation 604, the word-alignment computing system concurrently displays each of the sentences of the bilingual sentence pair via a UI on an output display (like display screen 104 shown in FIG. 1).

At operation 606, the word-alignment computing system waits for the user to produce an input event that indicates the user has chosen an of-interest word or phrase in one of the sentences. That input event may be, for example, a mouse cursor hovering over or near (i.e., proximate) to a word or phrase. The input event may be the result of a more active selection by the user, such as a click (left- or right-click), a hot-key, or a text selection by dragging the cursor over the desired text. Dragging here includes moving the cursor while pressing a button (typically on the mouse itself).

At operation 608, once the of-interest word is chosen, the system performs a query based upon the of-interest word or phrase. The query may be via an online search engine like BING™ brand search engine by the Microsoft Corporation. Alternatively, the query may be to a dictionary, multilingual dictionary or translator. Alternatively still, the query may be made to a database where the meaning of word is described or elaborated upon.

Instead of just searching based upon the of-interest word, other implementations that combine with process 500, may query on the linked word or phrase as well as, or instead of, the of-interest word or phrase. So in this instance the user may get, in response to selecting an English word, an English definition of its word-aligned Russian word in the Russian sentence of a bilateral sentence pair.

At operation 610, the system presents the results of the query.

Figure 7:
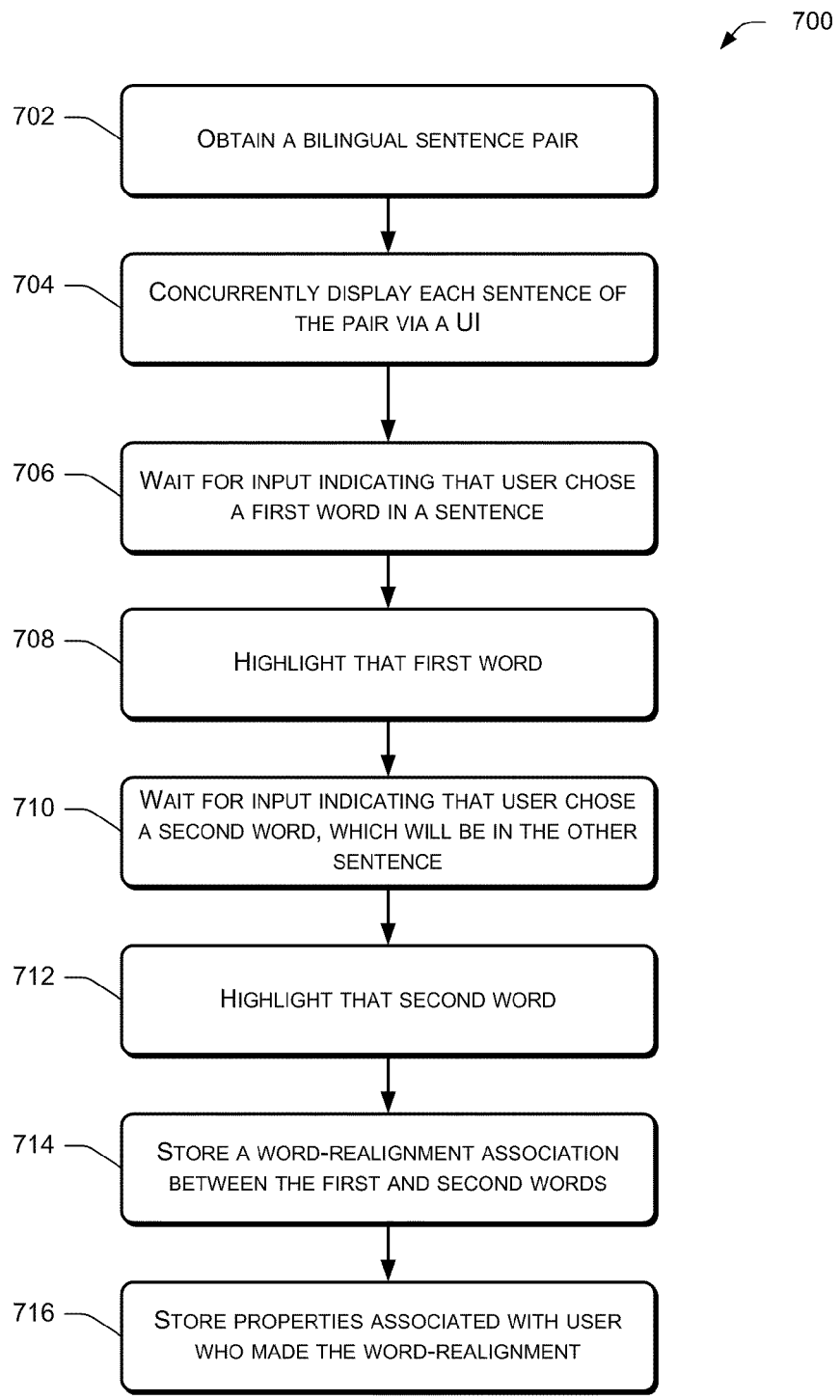

FIG. 7 illustrates a process 700 for helping improve word alignments. The process is performed at least in part by the word-alignment computing system. Process 700 employs the word-alignment computing system like that of processes 500 and 600. Also, process 700 may be employed along with that of other processes described herein or separately.

As shown here, the process 700 begins with operation 702, where the word-alignment computing system obtains at least one bilingual sentence pair. At operation 704, the word-alignment computing system concurrently displays each of the sentences of the bilingual sentence pair via a UI on an output display (like display screen 104 shown in FIG. 1).

At operation 706, the word-alignment computing system waits for the user to produce an input event that indicates the user has chosen a first word or phrase in one of the sentences. The first word or phrase can be in either sentence regardless of language or order of the sentences. For the sake of clarity, the sentence with the first word or phrase is called the "first" sentence herein.

At operation 708, once the first word or phrase is chosen, the system highlights that first word or phrase.

Next, at operation 710, the system waits for the user to produce another input event that indicates the user has chosen a second word or phrase in the other of the two sentences. For the sake of clarity, the sentence with the second word or phrase is called the "second" sentence herein.

Once the user has selected both the first and the second words or phrases, she has indicated that these two words or phrases should be aligned. This is called word-realignment or user-feedback word realignment herein.

At operation 712, once the second word or phrase is chosen, the system highlights that second word or phrase.

At operation 714, the system stores the user-feedback word realignment.

In addition, at operation 716, the system stores other properties associated the user who performed this user-feedback word realignment. For example, other properties may include a measure of the time between word selections, which may be an indicator of whether the user seriously contemplated the contextual meaning of the words.

Figure 8:
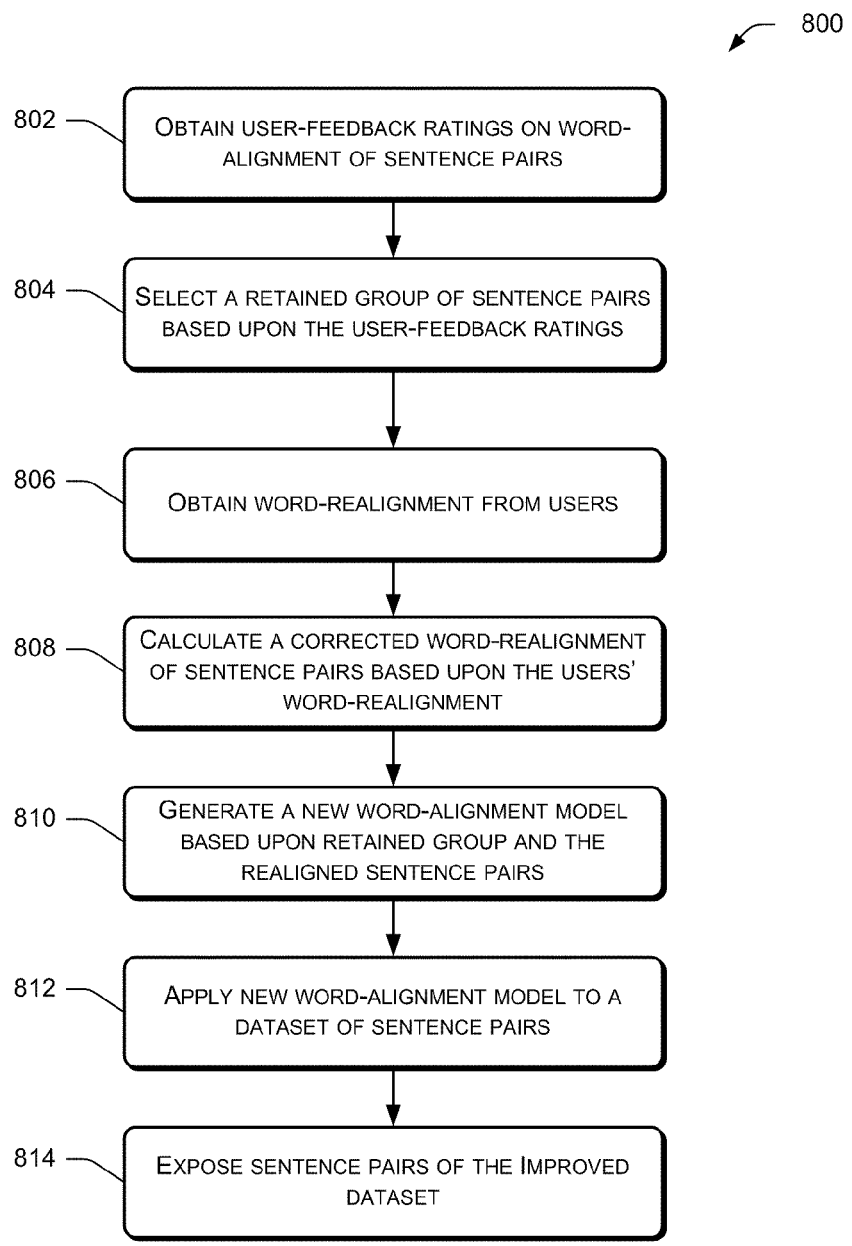

FIG. 8 illustrates a process 800 for helping improve word alignments. The process is performed at least in part by the word-alignment computing system. Process 800 employs the word-alignment computing system like that of the other processes already described. Also, process 800 may be employed along with that of other processes described herein or separately.

As shown here, the process 800 begins with operation 802, where the system obtains user-feedback ratings regarding the user-perceived quality of existing word-alignments for a dataset of bilingual sentence pairs.

At operation 804, the system selects a retained group of sentence pairs based upon the user-feedback ratings. This also can be described as the system dividing the dataset of bilingual sentence pairs into at least two groups. The retained group includes sentence pairs that meet or exceed a defined quality standard based upon the obtained user-feedback ratings. A to-be-revised group includes sentence pairs having an existing word-alignment that falls below a defined quality standard based upon the obtained user-feedback ratings.

The defined quality threshold may be set automatically (via a statistical analysis) or manually by a human operator. Once set, each sentence pair has an overall rating that meets or exceeds a threshold or, of course, falls below that threshold. The overall rating of each sentence pair may be calculated based upon a number of factors, such as median or mean of user-feedback ratings of the word-alignment of a particular pair. Other statistical factors may be used as well, including quantity of specific ratings (e.g., at least 500 "up" ratings) or weighting based upon confidence associated with particular users.

At operation 806, the word-alignment computing system obtains user-feedback word-realignment data regarding many of the sentence pairs in the dataset.

This user-feedback word-realignment data and the user-feedback ratings may be acquired from a multitude of multilingual users over the Internet. Because of the potentially global scale, the feedback may be received from thousands, hundreds of thousands, and perhaps even millions of users.

At operation 808, based upon the obtained user-feedback word-realignment of the realigned sentence pairs, the system calculates a corrected word-realignment of the realigned sentence pairs. These pairs may be called the "corrected" group or "realigned" group.

As part of this operation, the system may calculate a user-specific confidence value based, at least, upon factors associated with the user. The system then repeats that calculation for each user of the group being considered. Each link is weighed based upon the calculated user-specific confidence value for each user of the many users. Then the system selects the corrected word-realignment of the realigned sentence pairs based upon the weighted links.

Next, at operation 810, the system generates a new and presumably improved word-alignment model based upon the retained group of sentence pairs and the realigned sentence pairs.

At operation 812, the system applies the new word-realignment model to the same or another multilingual textual dataset. This is the improved multilingual textual dataset.

At operation 814, the system exposes the pairs of sentences from the improved multilingual textual dataset. This would be done much like is discussed herein about processes 500, 600, and 700.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. One or more computer-readable storage devices storing processor-executable instructions that, when executed, cause one or more processors to perform operations that facilitate interactive exposing of word-alignments between a bilingual sentence pair, the operations comprising:
concurrently displaying each sentence of the bilingual sentence pair via a user-interface (UI);
receiving a user selection of an of-interest word or phrase of a first sentence of the bilingual sentence pair;
in response to the receiving, performing actions including:
highlighting the of-interest word or phrase via the UI;
finding a linked word in a second sentence of the bilingual sentence pair that corresponds to the of-interest word; and
highlighting the linked word via the UI; and
presenting to a user, via the UI, a control to reassign the highlighted word-alignment between the bilingual sentence pair.

2. One or more computer-readable storage devices as recited in claim 1, wherein the finding and highlighting actions are performed while still concurrently displaying each sentence of the bilingual sentence pair via the UI.

3. One or more computer-readable storage devices as recited in claim 1, wherein the performing actions further comprise:
finding a linked phrase in the second sentence of the bilingual sentence pair that corresponds to the of-interest word or phrase in the first sentence of the bilingual sentence pair, wherein the linked phrase includes more than one word; and
highlighting the linked phrase via the UI.

4. One or more computer-readable storage devices as recited in claim 1, wherein a user-directable position indicator is proximate to the of-interest word or phrase when input causes a graphical cursor to hover over or near the of-interest word or phrase in the UI.

5. One or more computer-readable storage devices as recited in claim 1, the operations further comprising, in response to the receiving, performing a dictionary look-up of the of-interest word and displaying the results of the dictionary look-up.

6. One or more computer-readable storage devices as recited in claim 1, the operations further comprising, in response to the receiving, performing an online search engine query of the of-interest word and displaying the results of the query.

7. One or more computer-readable storage devices as recited in claim 1, the operations further comprising emphasizing an emphasis word or phrase in each of the first and second sentences of the bilingual sentence pair, wherein the emphasis word or phrase of each sentence is word-aligned with a query word or phrase of the other sentence.

8. One or more computer-readable storage devices as recited in claim 7, the operations further comprising before the concurrently displaying, receiving, performing, and emphasizing operations, searching based upon the query word or phrase, wherein the emphasis word or phrase includes the query word or phrase.

9. One or more computer-readable storage devices as recited in claim 1, wherein the receiving of the user selection of the of-interest word or phrase includes determining that a user-directable position indicator is proximate to the of-interest word or phrase.

10. One or more computer-readable storage devices as recited in claim 1, the operations further comprising:
determining that a user selected a first word or phrase of the first sentence of the bilingual sentence pair;
in response to determining that the user selected the first word or phrase, highlighting the first word or phrase via the UI;
determining that the user selected a second word or phrase of a second sentence of the bilingual sentence pair;
in response to determining that the user selected the second word or phrase, highlighting the second word or phrase via the UI; and
storing a user-feedback word-alignment association between the first word or phrase and the second word or phrase.

11. One or more computer-readable storage devices storing processor-executable instructions that, when executed, cause one or more processors to perform operations that facilitate interactive collection of user feedback regarding word-alignments between a bilingual sentence pair, the operations comprising:
concurrently displaying each sentence of the bilingual sentence pair via a user-interface (UI) on an output display;
determining whether a user selected an of-interest word or phrase of a first sentence of the bilingual sentence pair;

in response to determining that the user selected the of-interest word or phrase of the first sentence, highlighting the of-interest word or phrase via the UI;

determining whether the user selected a linked word or phrase of a second sentence of the bilingual sentence pair;

in response to determining that the user selected the linked word or phrase of the second sentence, highlighting the linked word or phrase via the UI;

receiving feedback from the user regarding a quality of the word-alignments between the bilingual sentence pair;

rating the feedback based at least in part on an amount of time between highlighting the linked word or phrase via the UI and receiving the feedback; and storing the feedback; wherein the storing comprises storing at least a user identifier field that identifies the user who made the selections of the determining operations.

12. One or more computer-readable storage devices as recited in claim 11, the operations further comprising repeating the operations of claim 11 for multiple of-interest words or phrases and multiple associated linked words or phrases.

13. One or more computer-readable storage devices as recited in claim 11 further comprising measuring properties associated with the user selecting multiple of-interest words or phrases and associated linked words or phrases, wherein the properties include timing of a selection of each word relative to one or more selections of other words.

14. One or more computer-readable storage devices as recited in claim 11, wherein the first sentence of the bilingual sentence pair is in a first human natural language and the second sentence of the bilingual sentence pair is in a second particular human natural language.

15. One or more computer-readable storage devices as recited in claim 11, wherein rating the feedback comprises:

assigning a high confidence rating when the amount of time between highlighting the linked word or phrase via the UI and receiving the feedback is greater than a predetermined threshold; and assigning a low confidence rating when the amount of time between highlighting the linked word or phrase via the UI and receiving the feedback is less than a predetermined threshold.

16. One or more computer-readable storage devices as recited in claim 11, wherein rating the feedback comprises determining a user confidence rating for the user providing the received feedback based at least on part on previous feedback received from the user.

17. A method of improving word-alignments between a dataset of bilingual sentence pairs based upon collection of user feedback, the method comprising:

obtaining user-feedback ratings of the user's assessment of a quality standard of existing word-alignment of sentence pairs of the dataset of bilingual sentence pairs;

dividing the dataset of bilingual sentence pairs into at least two groups, where a retained group includes sentence pairs that meet or exceed the quality standard based upon the obtained user-feedback ratings and a to-be-revised group includes sentence pairs having the existing word-alignment that fall below the quality standard based upon the obtained user-feedback ratings;

obtaining, from multiple users, user-feedback word-realignment of words in realigned sentence pairs of the dataset of bilingual sentence pairs;

based upon the obtained user-feedback word-realignment of the realigned sentence pairs, calculating a corrected word-realignment of the realigned sentence pairs; and generating a new word-alignment model based upon the retained group of sentence pairs and the realigned sentence pairs.

18. A method as recited in claim 17, the method further comprising applying the new word-alignment model to another dataset of bilingual sentence pairs.

19. A method as recited in claim as recited in claim 17, the method further comprising:

applying the new word-alignment model to another dataset of bilingual sentence pairs; and exposing, via a user-interface (UI) on an output display, bilingual sentence pairs of the another dataset of bilingual sentence pairs.

20. A method as recited in claim as recited in claim 17, wherein the calculating of the corrected word-realignment of the realigned sentence pairs includes:

calculating a user-specific confidence value based, at least, upon factors associated with the user;

repeating the calculating for many users;

weighing each realignment based upon the calculated user-specific confidence value for each user of the many users; and selecting the corrected word-realignment of the realigned sentence pairs based upon the weighted realignments.

* * * * *